US009503653B2

(12) United States Patent
Xing et al.

(10) Patent No.: US 9,503,653 B2
(45) Date of Patent: Nov. 22, 2016

(54) METHOD FOR DETERMINING ATTITUDE OF STAR SENSOR BASED ON ROLLING SHUTTER IMAGING

(71) Applicant: Tsinghua University, Beijing (CN)

(72) Inventors: Fei Xing, Beijing (CN); Zheng You, Beijing (CN); Ting Sun, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 289 days.

(21) Appl. No.: 13/983,979

(22) PCT Filed: Apr. 25, 2013

(86) PCT No.: PCT/CN2013/074743
§ 371 (c)(1),
(2) Date: Apr. 15, 2014

(87) PCT Pub. No.: WO2014/124574
PCT Pub. Date: Aug. 21, 2014

(65) Prior Publication Data
US 2014/0232867 A1    Aug. 21, 2014

(30) Foreign Application Priority Data
Feb. 18, 2013 (CN) .......................... 2013 1 0053052

(51) Int. Cl.
*H04N 5/20* (2006.01)
*G01S 3/78* (2006.01)
*H04N 5/235* (2006.01)
*G01S 3/786* (2006.01)
*H04N 5/232* (2006.01)

(52) U.S. Cl.
CPC .......... *H04N 5/2353* (2013.01); *G01S 3/7867* (2013.01); *H04N 5/2329* (2013.01)

(58) Field of Classification Search
USPC ....................................................... 348/144
See application file for complete search history.

(56) References Cited

U.S. PATENT DOCUMENTS

| | | | | |
|---|---|---|---|---|
| 4,679,753 A | * | 7/1987 | Landecker | G09B 9/52 244/171 |
| 5,412,574 A | * | 5/1995 | Bender | B64G 1/36 244/164 |
| 6,404,851 B1 | * | 6/2002 | Possin | A61B 6/4233 348/E3.019 |

(Continued)

*Primary Examiner* — Reza Aghevli
(74) *Attorney, Agent, or Firm* — Hodgson Russ LLP

(57) ABSTRACT

A method for determining an attitude of a star sensor based on a rolling shutter imaging is provided. The method comprises: optimizing a relation among an exposure time, a line readout time, an interline integral interval time and a frame processing time of an image for the rolling shutter imaging by using a rolling shutter model of an image sensor in the star sensor based on a line; predicting and extracting locations of M navigation stars comprised in a star map in the star sensor according to the optimized relation among the exposure time, the line readout time, the interline integral interval time and the frame processing time; and transferring an updated the attitude matrix and an updated angular velocity of the star sensor sequentially until a final attitude matrix and a final angular velocity of the star sensor are obtained.

10 Claims, 3 Drawing Sheets

(56) References Cited

U.S. PATENT DOCUMENTS

| | | | | |
|---|---|---|---|---|
| 2004/0027462 | A1* | 2/2004 | Hing | G01J 3/02 |
| | | | | 348/222.1 |
| 2005/0264684 | A1* | 12/2005 | Kamon | H04N 5/2351 |
| | | | | 348/362 |
| 2005/0270412 | A1* | 12/2005 | Kamon | H04N 5/235 |
| | | | | 348/362 |
| 2006/0085130 | A1* | 4/2006 | Belenkii | G01C 21/025 |
| | | | | 701/468 |
| 2006/0238632 | A1* | 10/2006 | Shah | H04N 5/3591 |
| | | | | 348/296 |
| 2011/0010129 | A1* | 1/2011 | Kirby | G01B 11/002 |
| | | | | 702/153 |
| 2011/0019022 | A1* | 1/2011 | Airey | H04N 3/155 |
| | | | | 348/222.1 |

* cited by examiner

METHOD FOR DETERMINING ATTITUDE OF STAR SENSOR BASED ON ROLLING SHUTTER IMAGING

CROSS-REFERENCE TO RELATED APPLICATION

This application claims priority to and benefits of Chinese Patent Application Serial No. 201310053052.0, filed with the State Intellectual Property Office of P. R. China on Feb. 18, 2013, the entire content of which is incorporated herein by reference.

FIELD

Embodiments of the present disclosure generally relate to the attitude sensor field, and more particularly relate to a method for determining an attitude of a star sensor based on a rolling shutter imaging.

BACKGROUND

The star sensor is an absolute attitude measure system referring to the celestial body azimuth, having the features of high measure precision, no drift and long working life. Meanwhile, the star sensor is a basal and pivotal part of a spacecraft, and is an important part of the space technology development. The star sensor plays an irreplaceable important role in the space application like earth-pointing remote sensing, deep space exploration, space attack-defense and so on. The star sensor has the huge economic and social benefits and also has important strategic significance. Presently, the star sensor is universally considered to be a sensor having the highest attitude measure precision in a satellite, the pointing axis accuracy of the star sensor may reach 10", and the update rate of the star sensor may be 1-5 Hz. However, the conventional star sensor adopts large area array and frame image processing mode, which makes the update rate low and the dynamic property poor. This has become the main technical barrier in the development of the star sensor. The conventional star sensor cannot satisfy the increasing requirement of the fast development of high resolution earth-pointing imaging, high-precision mapping and other space missions, and this has become an important bottle neck to restrict the advancement of the spaceflight field, more particularly the space remote sensing technology.

SUMMARY

Embodiments of the present disclosure seek to solve at least one of the problems existing in the prior art to at least some extent.

According to an embodiment of the present disclosure, a method for determining an attitude of a star sensor based on a rolling shutter imaging is provided. The method comprises steps of: S1: optimizing a relation among an exposure time $t_{Int}$, a line readout time $t_{rd}$, an interline integral interval time and $t_{ri}$ frame processing time $t_{Fp}$ of an image for the rolling shutter imaging by using a rolling shutter model of an image sensor in the star sensor based on a line; S2: predicting and extracting locations of M navigation stars comprised in a star map in the star sensor according to the optimized relation among the exposure time $t_{Int}$, the line readout time $t_{rd}$, the interline integral interval $t_{ri}$ and the frame processing time $t_{Fp}$, in which the location of each navigation star is used to determine a line number of the each navigation star in the star sensor; and S3: updating an attitude matrix and an angular velocity of the star sensor according to the locations of the navigation stars and based on a single star recursion attitude estimation of the rolling shutter imaging whenever the position of one navigation star is extracted, applying the attitude matrix of the star sensor to a calculation of the attitude matrix of a next navigation star by recursion to obtain a recurring attitude matrix of the star sensor, fusing the location of the next navigation star and the recurring attitude matrix of the star sensor to form an updated attitude matrix and an updated angular velocity of the star sensor, and transferring the updated the attitude matrix and the updated angular velocity of the star sensor sequentially until a final attitude matrix and a final angular velocity of the star sensor are obtained.

With the imaging parameter optimization method of star sensor based on the rolling shutter according to an embodiment of the present disclosure, it is capable to achieve accurate separation of the exposure moments of different navigation stars by precisely controlling the imaging moments of different lines in the star map, which makes up for the lack of dynamic information because the exposure moments of all navigation stars in a single frame of star map are identical; and the adoption of readout and exposure pipelining work mode saves the readout time of the conventional star sensor. Therefore, a continuous navigation star prediction and extracting algorithm with high dynamic property is proposed, and a single star recursion attitude estimation method in the rolling shutter mode is also proposed, thus completing an attitude at a current moment whenever one star is extracted and breaking the algorithm constraints of the star sensor attitude determination based on the multi-vector of the frame image. Moreover, the update rate is increased by one order of magnitude compared with the conventional algorithm, and it is capable to achieve the attitude estimation while there is only one or no star in the field of view for a short time.

In one embodiment, the image sensor is an APS (Active Pixel Sensor) image sensor having the rolling shutter mode disposed in the star sensor.

In one embodiment, a sensor line number of the image sensor is "n", and the line readout time $t_{rd}$ of each line of the image is identical to the interline integral interval time $t_{ri}$, and the exposure time $t_{Int}$ of the image satisfies a following formula:

$$t_{Int} \leq (n-1) t_{rd}.$$

In one embodiment, in step S1; the image sensor is configured to perform a circular exposure based on the line sequentially, to circularly read the image obtained by the circular exposure with the line readout time $t_{rd}$ sequentially, and to synchronize the reading of the image and the exposure of the image, in which a first read moment of the image obtained by the exposure is identical to an exposure moment of an $n^{th}$ line of the image.

In one embodiment, step S2 comprises:

S21: combining the attitude matrix of the star sensor with a time $t_k$ of extracting a $k^{th}$ navigation star to form a combined variable AR:

$$AR_k = [A_k \ t_k] = [A_k \ m_k t_{ri}]$$

where $A_k$ represents the attitude matrix of the star sensor obtained by calculation after the location of the $k^{th}$ navigation star is extracted, $t_k$ represents an exposure moment corresponding to the $k^{th}$ navigation star, and $m_k$ represents a line number of the $k^{th}$ navigation in the image sensor;

S22: predicting the locations of the M navigation stars in a field of view of the star sensor; and S23: setting a ROI window based on the predicted locations of the M navigation stars to extract the locations of the M navigation stars.

In one embodiment, step S22 comprises:

S221: assuming that an $M^{th}$ navigation star in a previous frame of the image is located in an $m_0$ line and the attitude matrix of the star sensor obtained after the location of the $M^{th}$ navigation star is extracted is $A_0$, obtaining the angular velocity $\tilde{\omega}_0$ of the star sensor by estimating;

S222: assuming that a first navigation star in a current frame of the image is located in an $m_1$ line and the attitude matrix of the star sensor obtained after the location of the first navigation star is extracted is $A_1$, obtaining the angular velocity $\tilde{\omega}_1$ of the star sensor by estimating:

$$\tilde{\omega}_1 = [I - A_1 A_0^T]/[(n - m_0 + m_1)t_{ri}],$$

obtaining a predicted location $(\hat{x}_{m1-M}, \hat{y}_{m1-M})$ of the first navigation star relative to the $M^{th}$ navigation star by estimating a location of the $M^{th}$ navigation star in the image sensor in the current frame;

S223: obtaining the predicted locations $(\hat{x}_{m2-M}, \hat{y}_{m2-M})$–$(\hat{x}_{(M-1)-M}, \hat{y}_{(M-1)-M})$ of the $M^{th}$ navigation star relative to the $2^{nd}$-$(M-1)^{th}$ navigation stars sequentially;

S224: estimating the location of the $M^{th}$ navigation star in the current frame based on the $\tilde{\omega}_0$ and the predicted locations of the $M^{th}$ navigation star; and S225: repeating steps S221-S224 to obtain the predicted locations of other navigation stars sequentially.

In one embodiment, step S3 comprises:

S31: obtaining an attitude matrix $q_k$, a character matrix $K_k$ and an angular velocity $\tilde{\omega}_k$ of an initial frame of the image according to an initial capturing algorithm, and recording a line number $m_k$ of a $k^{th}$ navigation star;

S32: extracting a location of a $(k+1)^{th}$ navigation star with a line number of $m_{k-1}$, estimating a difference of exposure times of the $k^{th}$ navigation star and the $(k+1)^{th}$ navigation star according to the angular velocity $\tilde{\omega}_k$, the line number $m_k$ of the $k^{th}$ navigation star, the $k^{th}$ navigation star and a previous attitude matrix, and calculating a transition matrix $\Phi_{k+1/k}$;

S33: estimating a character matrix $K_{k+1/k}$ corresponding to an attitude quaternion of a moment corresponding to the $k^{th}$ navigation star:

$$K_{k+1/k} = \Phi_{k+1/k} K_{k/k} \Phi_{k+1/k}^T;$$

S34: adding a measure vector and a reference vector of the $(k+1)^{th}$ navigation star to the estimation of the attitude matrix of the star sensor according to a vector observation value and a vector reference value of the $(k+1)^{th}$ navigation star, and calculating $\delta K_{k-1}$ of the $(k+1)^{th}$ navigation star;

S35: fusing data of steps S33 and S34 to calculate a character matrix $K_{k+1/k+1}$ corresponding to a quaternion including the $k^{th}$ navigation star:

$$K_{k+1/k+1} = (1-\rho) K_{k+1/k} + \rho \delta K_{k+1}$$

where $0 < \rho < 1$, and $\rho$ represents a weighing coefficient of the $k^{th}$ navigation star vector; and S36: calculating an optimal attitude quaternion $q^*_{k+1/k+1}$ and an angular velocity $\tilde{\omega}_{k+1}$ according to the character matrix $K_{k+1/k+1}$, and returning back to step S32 to perform a next recursion and a next attitude matrix estimation of the star sensor.

In one embodiment, in step S32, a following formula is obtained according to a relation between a quaternion difference equation and the angular velocity:

$$\dot{q} = \frac{1}{2}\Omega q, \Omega = \begin{bmatrix} -[\omega \times] & \omega \\ -\omega^T & 0 \end{bmatrix}$$

where $[\omega \times]$ s:

$$[\omega \times] = \begin{bmatrix} 0 & -\omega_3 & \omega_2 \\ \omega_3 & 0 & -\omega_1 \\ -\omega_2 & \omega_1 & 0 \end{bmatrix}$$

and $\omega = [\omega_1, \omega_2, \omega_3]$ is a triaxial angular velocity of the star sensor.

In one embodiment, if the attitude quaternion estimated when a location of the $k^{th}$ navigation star is extracted is $q_k$, an angular velocity estimated when the location of the $k^{th}$ navigation star is extracted is $\tilde{\omega}_k = [\omega_1, \omega_2, \omega_3]^T$, the $k^{th}$ navigation star is located in a line $m_k$ in the image, and a location of the $(k+1)^{th}$ navigation star located in a line $m_{k+1}$ in the image is extracted, then an interval time from the $k^{th}$ navigation star to the $(k+1)^{th}$ navigation star is $(m_{k+1} - m_k)t_{ri}$, and a following formula is obtained:

$$\Phi_{k+1/k} = \exp\left(\frac{1}{2}\Omega_k (m_{k+1} - m_k) t_{ri}\right).$$

In one embodiment, in step S36:

the optimal attitude quaternion $q^*_{k+1/k+1}$ is obtained according to an eigenvalue and an eigenvector of the character matrix $K_{k+1/k+1}$, and satisfies:

$$K_{k+1/k+1} q^*_{k+1/k+1} = \lambda_{k+1/k+1} q^*_{k-1/k+1}$$

where the $(k+1)^{th}$ navigation star participates in the attitude mat estimation to obtain the angular velocity:

$$\begin{bmatrix} \tilde{\omega}_{k+1} \\ 0 \end{bmatrix} = \frac{2}{(m_{k+1} - m_k)t_{ri}} \begin{bmatrix} -e_{k+1} \\ q_{4,k+1} \end{bmatrix} \otimes \begin{bmatrix} e_{k+1} \\ q_{4,k+1} \end{bmatrix} - \frac{2}{(m_{k+1} - m_k)t_{ri}} \begin{bmatrix} -e_{k+1} \\ q_{4,k+1} \end{bmatrix} \otimes \begin{bmatrix} e_k \\ q_{4,k} \end{bmatrix},$$

where $e_k$ represents a vector ion of the quaternion q, and $q_{4,k}$ represents a scalar portion of the quaternion q.

The present disclosure breaks through the shortcomings such as long exposure time and long read time, poor dynamic property, deficient instantaneous view field precision and low system update rate of the conventional star sensor in the working process, thus improving the performance of the star sensor significantly.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
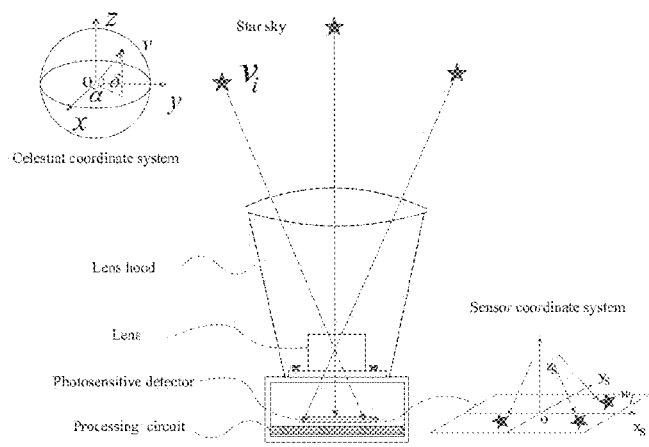
FIG. 1 is an imaging principle diagram of a star sensor according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the embodiments of the present disclosure, something need to be understood, relative terms such as "central", "longitudinal", "lateral", "upper", "lower", "front", "rear", "left", "right", "vertical", "horizontal", "top", "bottom", "inner", "outer" as well as derivative thereof. These relative terms are for convenience of description and do not require that the present disclosure be constructed or operated in a particular orientation. So the embodiments shall not be construed to limit the present disclosure. In addition, terms such as "first" and "second" are used herein for purposes of description and are not intended to indicate or imply relative importance or significance. In the specification, unless specified or limited otherwise, "a plurality of" refers to two or more.

Terms concerning attachments, coupling and the like, such as "connected" and "interconnected", refer to a relationship in which structures are secured or attached to one another either directly or indirectly through intervening structures, as well as both movable or rigid attachments or relationships, unless expressly described otherwise.

An operation principle of a star sensor will be described first.

Principle of Star Sensor

A fixed star is used as a reference when the star sensor works. The operation principle of the star sensor is shown in FIG. 1. The fixed star is imaged on a photosensitive detector via optical system of the star sensor. By numerous astronomical observations for many years, each fixed star is located in a relatively fixed position in a celestial sphere. As shown in FIG. 1, as expressed by a right ascension and a declination of a spherical coordinate of the celestial sphere, the coordinate of the fixed star in the spherical coordinate system of the celestial sphere may be recorded as ($\alpha$, $\delta$). According to the relationship between the Cartesian coordinate system and the spherical coordinate system of the celestial sphere, a direction vector of each fixed star in the Cartesian coordinate system of the celestial sphere may be obtained as follows:

$$v = \begin{bmatrix} \cos\alpha\cos\delta \\ \sin\alpha\cos\delta \\ \sin\delta \end{bmatrix}. \quad (1)$$

Navigation stars may be fixed stars meeting the imaging condition of the star sensor and selected from a star catalog so as to form a navigation star catalog. The navigation star catalog may be stored in the star sensor, for example, a memory in the star sensor, at one time during the manufacturing process.

When an attitude matrix of the star sensor in the celestial coordinate system is A, using the pinhole imaging principle of the star sensor, a direction vector $w_i$ of the navigation star $s_i$ in the star sensor coordinate system corresponding to a direction vector $v_i$ of the navigation star $s_i$ in the celestial coordinate system may be measured through a lens of the star sensor.

If a position of a main axis center of the star sensor in a detector is ($x_0$,$y_0$), a position coordinate of the navigation stars $s_i$ in the detector of the star sensor is ($x_i$,$y_i$), and a focal length of the star sensor is f, then the direction vector $w_i$ of the navigation star $s_i$ in the star sensor coordinate system is as follows:

$$w_i = \frac{1}{\sqrt{(x_i - x_0)^2 + (y_i - y_0)^2 + f^2}} \begin{bmatrix} -(x_i - x_0) \\ -(y_i - y_0) \\ f \end{bmatrix}. \quad (2)$$

In an ideal case, $$w_i = A v_i \quad (3)$$

where A is an attitude matrix of the star sensor in the celestial coordinate system.

When two or more stars are observed, the attitude matrix A of the star sensor may be directly solved by, for example, the QUEST method, that is, an optimal attitude matrix $A_q$ may be solved by minimizing a following objective function $J(A_q)$:

$$J(A_q) = \frac{1}{2} \sum_{i=1}^{n} \alpha_i \|w_i - A_q v_i\|^2 \quad (4)$$

where $\alpha_i$ represents a weighing coefficient, and $\Sigma\alpha_i=1$.

In this way, the optimal attitude $A_q$ of the star sensor in the celestial coordinate system may be obtained.

Basic Principle and Effect of Rolling Shutter Mode

Presently, the attitude update rate of the star sensor in a tracking state is generally 4-10 Hz, which is mainly determined by the sensitivity and lens aperture of a photosensitive detector (CCD or APS CMOS), and now the photosensitive detector based on APS technology is affected by the fill factor and other factors, resulting in low sensitivity and the exposure time required to detect a specified star of usually about 100-200 ms. Although the sensitivity of CCD is improved and the exposure time is slightly decreased compared with the APS process, the area array CCD readout time is long, and the exposure may not be performed during the data readout process, which becomes a major obstacle to affect the attitude update rate. With continuous improvement of the APS process, especially the emergence of a back-illuminated technology and a three-dimensional integrated process, the sensitivity of APS is gradually approaching to that of CCD, and the advantages of anti-radiation, flexible readout, low power consumption, etc. will make APS play an important role.

The present disclosure provides a method of improving the update rate, dynamic property and precision of the star sensor significantly without increasing the mass, power consumption and volume of the star sensor. The exposure and readout time parameters of the star sensor are reasonably optimized, and the prediction and extraction method of the star image point is improved and the attitude determination method is innovated. The present disclosure may increase the attitude update rate of the star sensor by one order of magnitude, achieve high-precision and high dynamic attitude output, and completely get out of the low attitude update rate and poor dynamic property of the star sensor. At the same time, the present disclosure may be extended to high-performance star cameras, multiple star sensor information fusion and other application systems formed by a big area or area array splicing, providing a new solution to achieve high precision, high dynamic property, high attitude update rate of the star sensor, and laying a foundation for the application of high-resolution imaging of satellites and fast response.

The following will briefly describe the rolling shutter. The rolling shutter is the unique characteristics of the APS photosensitive detector, and the adoption of the rolling shutter mode for high-speed moving objects will present image deformation. The following simple example is used to illustrate the basic principle of the rolling shutter mode. An imaging of a high-speed bus in the use of the rolling shutter mode is shown in FIG. 2.

Figure 2:
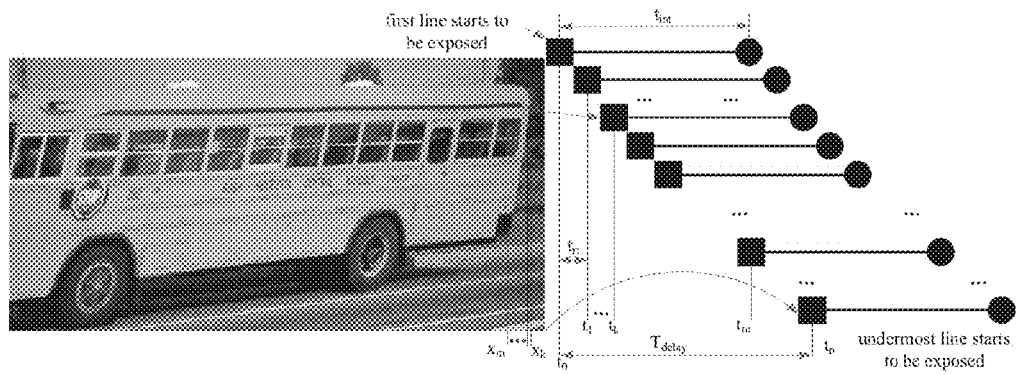
FIG. 2 is a schematic diagram showing a principle of a rolling shutter, which shows a moving object and an imaging time sequence in a rolling shutter mode.

As can be seen from FIG. 2, using the line-based rolling shutter mode, the exposure moments from top to bottom are different, and the time difference of the exposure start moment of each line and the exposure end moment of a previous line is $t_{ri}$. For the high-speed moving bus, the exposure start moment of its topmost portion is $t_k$, and the exposure start moment of the second line is $t_k+t_{ri}$. Due to the forward movement of the bus in this period, a movement is generated in the image plane of the camera, causing the bus to be inclined rearward from top to bottom, which is the basic principle of distortion of the moving object resulted from the rolling shutter mode. This distortion is a perfect reflection of the object motion information during the exposure time.

This effect provides a premise for the high update rate attitude determination of the star sensor. A brief description will be made by taking the bus movement in the FIG. 2 as an example. It is assumed that the position of the bus is calculated with the image, and the conventional mode is global shutter or snap shot image capturing mode. If and only if the exposure of the whole image is completed and the image results are acquired, the position of the bus is calculated. Since the entire image of the bus is exposed at the same moment, the image of the bus is not inclined, so it is unable to obtain its dynamic information and the location $x_0$ of the bus at the exposure moment $t_0$ can only be obtained. Although the location of the bus at the exposure moment $t_0$ can not be obtained, the locations $x_k$-$x_m$ of the bus during $t_k$-$t_m$ (as shown in FIG. 2) can be almost continuously obtained, if the rolling shutter mode is adopted. The adoption of the rolling shutter mode, after the optimization design, may realize the exposure and readout at the same time, it is capable to obtain the locations of the bus at the different moments for m−k+1 times after acquiring a complete image, and the update rate is improved m−k+1 times compared with the conventional global shutter mode.

Figure 3:
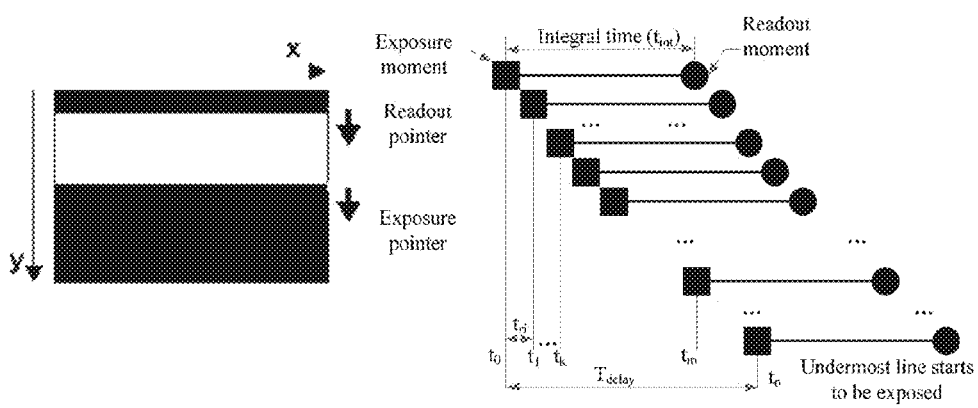
FIG. 3 is a schematic diagram showing ERS of an APS detector nd an exposure readout mode.

Analogously, the imaging mode based on the rolling shutter (Electric Rolling Shutter; ERS) is shown in FIG. 3. The rolling shutter imaging based on a line of the image sensor in the star sensor, i.e. a method of performing the image processing, star map recognition and attitude operation with a unit of line, replaces the conventional frame image processing mode in which the whole image is exposed simultaneously (i.e. snap shot or global shutter), so that precise control on the exposure moment of each line of a frame of image is achieved and the exposure moments of different navigation stars are distributed sequentially. For example, if 10 navigation stars are uniformly distributed in a column direction of the detector in the field of view of the star sensor and the single-frame exposure time is 100 ms, then the difference of the exposure moments of every two of the 10 stars on the detector (or image sensor) is 10 ms, and each star represents different attitude of the star sensor at different moments within 100 ms. With each star as an attitude arithmetical unit, it is capable to obtain the attitude change of the star sensor at different moments within 100 ms. By combining APS photosensitive detector exposure and readout pipelining, the line exposure time is set to be identical to the total readout time, and the exposure and readout are synchronized. Compared to a conventional processing mode in which a whole frame of image is first exposed at the same moment and then read out, with this method, the update rate of the star sensor is increased by 10 times, i.e. increased from the conventional 4-10 Hz to 40-100 Hz, so the dynamic property of the system will be significantly improved.

Basic Principle of Star Prediction in Star Sensor Attitude Tracking Mode

In the star sensor attitude tracking mode, the basic principle of the star prediction method is to perform difference recursion according to the attitude determined by the continuous two frames of star maps to estimate the attitude of the star sensor at a next moment, and to determine a location of a navigation star according to the estimated attitude. Specific star prediction methods are as follows.

1) An initial attitude $A(t_0)$ of the star sensor is obtained according to an initial capturing method.

2) An attitude $A_p(t+\delta t)$ of the star sensor at a next moment is predicted according to the estimated angular velocity and a current attitude matrix $A(t)$ of the star sensor by a folio linear estimation method:

$$A_p(t+\delta t)=[I-\omega\delta t]A(t) \quad (5)$$

In the case of stable operation, the movement angular velocity $\tilde{\omega}$ of the star sensor generally low, for example, the angular velocity of a low earth orbit satellite is about 0.06 °/s. According to conventional design ideas of the star sensor, the time of $\delta t$ is also about 0.1 s-0.2 s, $\|\omega\delta t\|<10^{-3}$ rad, and the predicted accuracy of a centroid is basically in the magnitude of microradian.

3) Assuming that $A_p(t+\delta t)\equiv[\hat{A}_1\ \hat{A}_2\ \hat{A}_3]^T$, the vector of the navigation star in the star catalog is $v_i$, and f is the focal length of the star sensor, it is capable to calculate the estimated value of the center coordinate of each star point according to formulas (2) and (3):

$$\hat{x}_i = x_0 - f\frac{\hat{A}_1^T v_i}{\hat{A}_3^T}, \hat{y}_i = y_0 - f\frac{\hat{A}_2^T v_i}{\hat{A}_3^T} \quad (6)$$

4) By taking $(x_i, y_i)$ as the center, navigation star extracting is performed in a ROI window to obtain the image star centroid $(x_i, y_i)$ at a moment (t+δt), and an attitude A(t+δt) of the star sensor is calculated according to the updated star image point centroid.

5) The estimated angular velocity $\tilde{\omega}$ is directly updated with a difference method according to A(t+δt) and A(t):

$$\tilde{\omega}=[I-A(t+\delta t)A^T(t)]/(\delta t) \quad (7)$$

6) Step 2) is returned to perform a next prediction and updating.

Principle of Attitude Estimation Method Based on Frame Image Mode

Star sensor attitude determination based on the global exposure mode such as snap shot is to perform attitude estimation for a plurality of vector measured at the same moment, belonging to the category of deterministic algorithms, which is the basis for various attitude fusion methods. Conventional methods mainly comprise TRIAD, QUEST, FOAM. ESOQ and expansion algorithms thereof, their accuracies are almost equal, and ESOO-II is the best in the computational efficiency. For a better understanding of an attitude determination method of the star sensor of the present disclosure, the attitude estimation based on a frame mode needs to be described briefly.

Typically, during the attitude estimation of the star sensor, a quaternion q generally represents an attitude, and an attitude matrix A and the quaternion q have the following relationship:

$$A(q)=(q_4^2-e^Te)I_3+2ee^T-2q_4[e\times] \quad (8)$$

where e and $q_4$ denote a vector part and a proportional part of the quaternion q respectively; $I_3$ is a 3×3 identity matrix, [e×] represents a cross-product matrix defined as follows:

$$[e\times] = \begin{bmatrix} 0 & -e_3 & e_2 \\ e_3 & 0 & -e_1 \\ -e_2 & e_1 & 0 \end{bmatrix} \quad (9)$$

In the prior art, the formula (4) can be expressed as follows:

$$J(A) = \frac{1}{2}\sum_{i=1}^{n}\alpha_i\|w_i - Av_i\|^2 = 1 - q^TKq \quad (10)$$

where a matrix K is determined by a plurality of vectors $w_i, v_i$ corresponding to each other in the star map, i=1, 2, ..., n $$\sum_{i=1}^{n}\alpha_i = 1 \quad (11)$$

3×3 matrixes B and S, and 3×1 column vector z and proportion coefficient σ are defined as follows:

$$\begin{cases} B = \sum_{i=1}^{n}\alpha_i w_i v_i^T \\ \sigma = tr(B) \\ z = \sum_{i=1}^{n}\alpha_i w_i \times v_i \\ S = B + B^T \end{cases} \quad (12)$$

A symmetric 4×4 matrix K is defined as follows:

$$K = \begin{bmatrix} S - \sigma I_3 & z \\ z^T & \sigma \end{bmatrix} \quad (13)$$

g(q) is defined as follows:

$$g(q)=q^TKq \quad (14)$$

As may be concluded by inducing formulas (10)-(4) that the solving of the optimal attitude A is to solve the maximum value of g(q) instead of minimizing a wahba function J(A). An optimal q* satisfies:

$$Kg^*=\delta q^* \quad (15)$$

Therefore, the problem is turned into the solving of the largest eigenvalue $\delta_{max}$ of the matrix K and the corresponding eigenvector q*. The prerequisite of this algorithm is that measurement vectors of all star image points is at the same moment. It should be noted that, in the conventional rolling shutter mode imaging process, this condition can not be satisfied, and its accuracy is limited even if this method is used for attitude estimation. The method for determining the attitude of the star sensor based on the rolling shutter imaging according to an embodiment of the present disclosure will be described below with reference to FIG. 4. In the attitude determination method of the star sensor based on rolling shutter imaging with high dynamic property and high update rate, it is capable to achieve the attitude update n times during extracting an image with n navigation stars in the star map.

Figure 4:
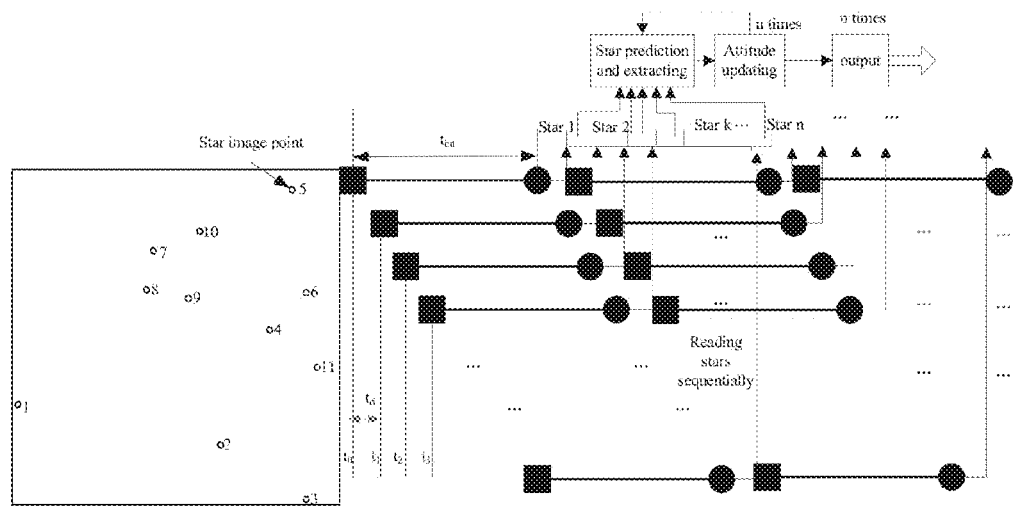
FIG. 4 is a schematic diagram of an operation principle of a star sensor based on a rolling shutter mode.
Figure 7:
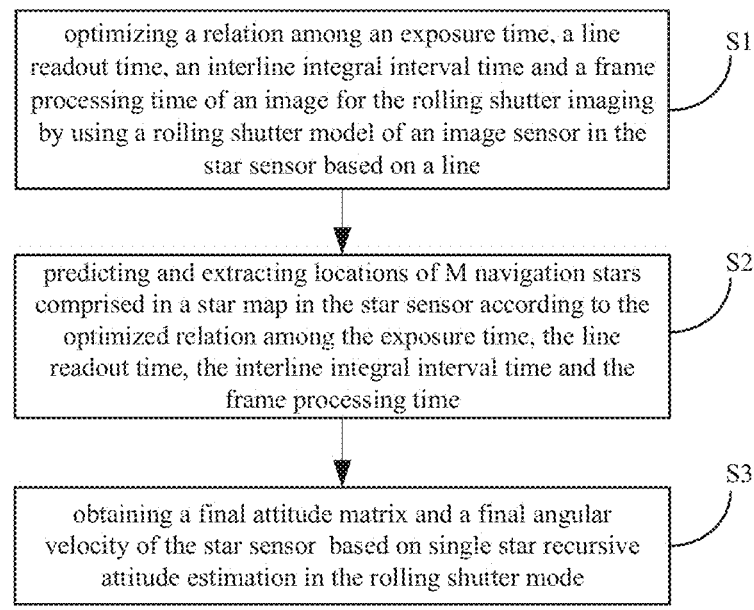
FIG. 7 is a flow chart of imaging method for determining an attitude of a star sensor based on a rolling shutter imaging according to an embodiment of the present disclosure.

As shown in FIGS. 4 and 7, the method for determining the attitude of the star sensor based on the rolling shutter imaging according to an embodiment of the present disclosure may comprise steps of:

(S1) optimizing a relation among an exposure time $t_{Int}$, a line readout time $t_{rd}$, an interline integral interval time $t_{ri}$ and a frame processing time $t_{Fp}$ of an image for the rolling shutter imaging by using a rolling shutter model of an APS image sensor in the star sensor based on a line;

(S2) predicting and extracting locations of M navigation stars comprised in a star map in the star sensor according to the optimized relation among the exposure time $y_{Int}$, the line readout time $t_{rd}$, the interline integral interval time $t_{ri}$ and the frame processing time $t_{FP}$, in which the location of each navigation star is used to determine a line number of the each navigation star in the star sensor; and (S3) updating an attitude matrix and an angular velocity of the star sensor according to the locations of the navigation stars and based on a single star recursion attitude estimation of the rolling shutter imaging whenever the position of one navigation star is extracted, applying the attitude matrix of the star sensor to a calculation of the attitude matrix of a next navigation star by recursion to obtain a recurring attitude matrix of the star sensor, fusing (as shown in FIG. 4) the location of the next navigation star and the recurring attitude matrix of the star sensor to form an updated attitude matrix and an updated angular velocity of the star sensor, and transferring the updated the attitude matrix and the updated angular velocity of the star sensor sequentially until a final attitude matrix and a final angular velocity of the star sensor are obtained.

Figure 5:
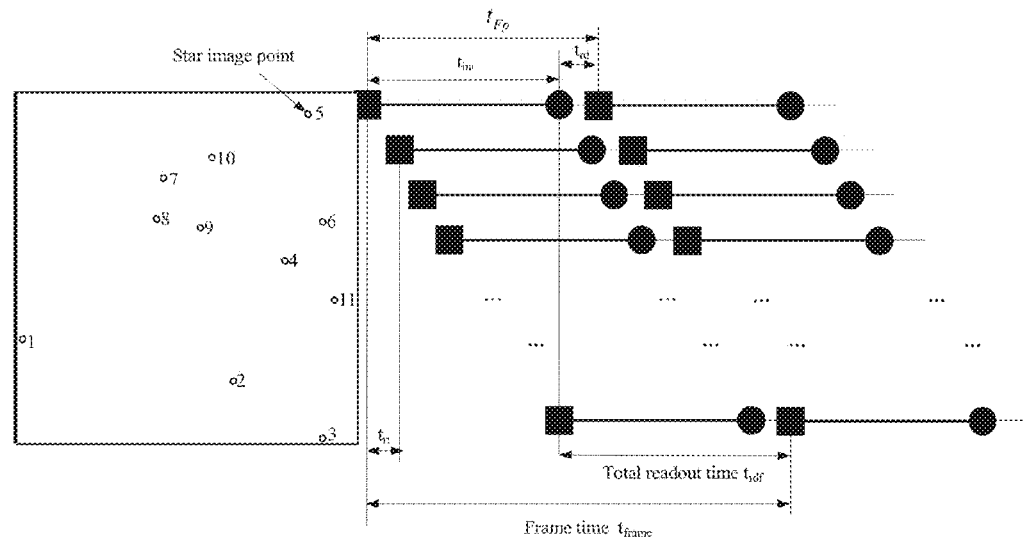
FIG. 5 is a schematic diagram of a real star map of an APS star sensor and a rolling shutter imaging.

Step S1 will be described below in detail. As shown in FIG. 5, the APS image sensor of star sensor is n lines, the line readout time of each line is $t_{rd}$, and the interline integral interval time is $t_{ri}$. In one embodiment, $t_{rd}=t_{ri}$, and the image integration (exposure) time $t_{Int} \leq (n-1)t_{rd}$. In this way, it is capable to realize the synchronization of exposure and readout. Compared to the conventional processing mode taking whole frame pictures at the same time and performing readout sequentially, this method will increase the star sensor update rate by nearly an order of magnitude. If setting the integral time $t_{Int}=(n-1)t_{rd}$, at this time, when the exposure of the last line (the $n^{th}$ line) of the image sensor is performed, readout of an image of the image integration (exposure) completed of the first row is started; next exposure of the first row after the first row readout is started and the readout of the second row is started, the same length of the exposure time of each row is ensured, the difference of the start time is $t_{rd}$, and constantly continuous pipeline operations of the image are achieved, thus obtaining the dynamic motion information of the star sensor continuously within the image integral time. The interval time of adjacent frames is:

$$t_{F_p} = t_{Int} + t_{rd} = \left(1 + \frac{1}{n-1}\right) t_{Int} = \left(\frac{n}{n-1}\right) t_{Int} \quad (16)$$

Since n is relatively large, when the star sensor is in the pipeline processing mode, it is considered that the frame processing time of the star sensor is approximately equal to the integral time of the APS image sensor. In FIG. 5, solid squares indicate the beginning of the exposure, and solid circle indicates the beginning of data readout.

As shown on the left in FIG. 5, the embodiment according to the present disclosure, for example, assuming 11 navigation stars existing in the star map of the star sensor, according to the pipeline operations rolling shutter mode, the exposure time of each navigation star is different. If taking real-time measurement information of each star image point as a reference basis for an attitude matrix update, the update rate of the attitude matrix may be increased by one order of magnitude.

Step S2 will be described below in detail. Step S2 may comprise:

(S21) combining the attitude matrix of the star sensor with a time $t_k$ of extracting a $k^{th}$ navigation star to form a combined variable AR:

$$AR_k \equiv [A_k \ t_k] \equiv [A_k \ m_k t_{ri}] \quad (17)$$

where $A_k$ represents the attitude matrix of the star sensor obtained by calculation after the location of the $k^{th}$ navigation star is extracted, $t_k$ represents an exposure moment corresponding to the $k^{th}$ navigation star, and $m_k$ represents a line number of the $k^{th}$ navigation star in the image sensor;

(S22) predicting the locations of the M navigation stars (for example, 11 navigation stars as shown in FIG. 5) in a field of view of the star sensor; and (S23) setting a ROI window based on the predicted locations of the M navigation s to extract the locations of the M navigation stars.

In one embodiment, step S22 comprises:

(S221) assuming that a $11^{th}$ navigation star in a previous frame of the image is located in an $m_0$ line and the attitude matrix of the star sensor obtained after the location of the $11^{th}$ navigation star is extracted is $A_0$, obtaining the angular velocity $\tilde{\omega}_0$ of the star sensor by estimating;

(S222) assuming that a first navigation star in a current frame of the image is located in an $m_1$ line and the attitude matrix of the star sensor obtained after the location of the first navigation star is extracted is $A_1$, obtaining the angular velocity $\tilde{\omega}_1$ of the star sensor by estimating similar to that in the formula (7):

$$\tilde{\omega}_1 = [I - A_1 A_0^T]/[(n-m_0+m_1)t_{ri}] \quad (18)$$

obtaining a predicted location $(\hat{x}_{m_1-11}, \hat{y}_{m_1-11})$ of the first navigation star relative to the $11^{th}$ navigation star by estimating (similar to that in the formula (6)) a location of the $11^{th}$ navigation star in the image sensor in the current frame;

(S223) obtaining the predicted locations $(\hat{x}_{m_2-11}, \hat{y}_{m_2-11}) \sim (\hat{x}_{m_{10}-11}, \hat{y}_{m_{10}-11})$ of the $11^{th}$ navigation star relative to the $2^{nd}$-$10^{th}$ navigation stars sequentially;

(S224) estimating the location of the $11^{th}$ navigation star in the current frame based on the $\tilde{\omega}_0$ and the predicted locations of the $11^b$ navigation star; and (S225) repeating steps S221-S224 to obtain the predicted locations of other navigation stars sequentially.

Figure 6:
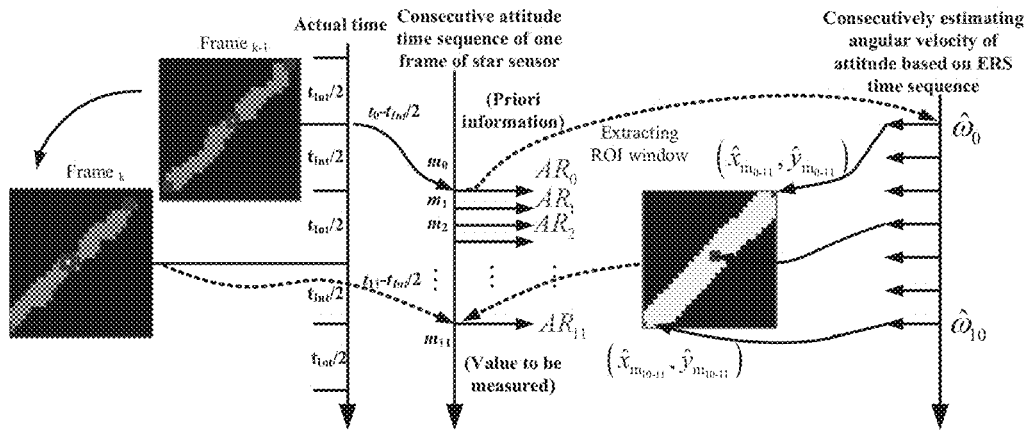
FIG. 6 is a schematic diagram of a star point prediction and extracting window (ROI) based on multiple single star attitude estimation.

FIG. 6 represents the process of predicting the last star point of the $k^{th}$ image (Frame$_k$) from the last star point of the $(k-1)^{th}$ image (Frame$_{k-1}$), where $t_{Int}$ represents the integral time of the navigation star.

Step S3 will be described below in detail. Step S3 may comprise:

(S31) obtaining an attitude matrix $q_k$, a character matrix $K_k$ and an angular velocity $\tilde{\omega}_k$ of an initial frame of the image according to an initial capturing algorithm, and recording a line number $m_k$ of a $k^{th}$ navigation star;

(S32) extracting a location of a $(k+1)^{th}$ navigation star with a line number of $m_{k+1}$, estimating a difference of exposure times of the $k^{th}$ navigation star and the $(k+1)^{th}$ navigation star according to the angular velocity $\tilde{\omega}_k$, the line number $m_k$ of the $k^{th}$ navigation star, the $k^{th}$ navigation star and a previous attitude matrix, and calculating a transition matrix $\Phi_{k+1/k}$;

(S33) estimating a character matrix $K_{k+1/k}$ corresponding to an attitude quaternion of a moment corresponding to the $k^{th}$ navigation star:

$$K_{k+1/k} = \Phi_{k+1/k} K_{k/k} \Phi_{k+1/k}^T \quad (19),$$

(S34) adding a measure vector and a reference vector of the $(k+1)^{th}$ navigation star to the estimation of the attitude matrix of the star sensor according to a vector observation value and a vector reference value of the $(k+1)^{th}$ navigation star, and calculating $\delta K_{k-1}$ of the $(k+1)^{th}$ navigation star according to the formulas (12) and (13), in one embodiment, $\delta K_{k+1}$ by the following formula:

$$\delta K_{k+1} = \begin{bmatrix} S_{k+1} - \sigma I_3 & z_{k+1} \\ z_{k+1}^T & \sigma_{k+1} \end{bmatrix} \quad (20)$$

the star sensor obtaining the $(k+1)^{th}$ navigation star $s_{k+1}$ (the corresponding direction vector in the celestial coordinate system being $v_{k-1}$), the direction vector in the coordinate system of the star sensor being:

$$B_{k+1} = \alpha_{k+1} w_{k+1} v_{k+1}^T$$

$$S_{k+1} = B_{k+1} + B_{k+1}^T$$

$$z_{k+1} = \alpha_{k+1} w_{k+1} \times v_{k+1}$$

$$\sigma_{k+1} = tr(B_{k+1})$$

where $0<\alpha_{k+1}<1$ is a weighing coefficient of the $(k+1)^{th}$ navigation star;

(S35) fusing data of steps S33 and S34 to calculate a character matrix $K_{k+1/k+1}$ corresponding to a quaternion including $k^{th}$ navigation star:

$$K_{k+1/k-1} = (1-\rho) K_{k+/k} + \rho \delta K_{k+1} \qquad (21)$$

where $0<\rho<1$, and $\rho$ represents a weighing coefficient of the $k^{th}$ navigation star vector; and (S36) calculating an optimal attitude quaternion $q^*_{k+1/k+1}$ and an angular velocity $\tilde{\omega}_{k+1}$ according to the character matrix $K_{k+1/k+1}$, and returning back to step S32 to perform a next recursion and a next attitude matrix estimation of the star sensor.

In one embodiment, in step (32), a following formula is obtained according to a relation between a quaternion difference equation and the angular velocity:

$$\dot{q} = \frac{1}{2} \Omega q, \qquad (22)$$

$$\Omega = \begin{bmatrix} -[\omega \times] & \omega \\ -\omega^T & 0 \end{bmatrix}$$

where $[\omega \times]$ is:

$$[\omega \times] = \begin{bmatrix} 0 & -\omega_3 & \omega_2 \\ \omega_3 & 0 & -\omega_1 \\ -\omega_2 & \omega_1 & 0 \end{bmatrix}$$

and $\omega = [\omega_1, \omega_2, \omega_3]$ a triaxial angular velocity of the star sensor.

According to the image of the navigation star of FIG. 5, if the attitude quaternion estimated when a location of the $k^{th}$ navigation star is extracted is $q_k$, an angular velocity estimated when the location of the $k^{th}$ navigation star is extracted is $\tilde{\omega}_k = [\omega_1, \omega_2, \omega_3]^T$, the $k^{th}$ navigation star is located in a line $m_k$ in the image, and a location of the $(k+1)^{th}$ navigation star located in a line $m_{k+1}$ in the image is extracted, then an interval time from the $k^{th}$ navigation star to the $(k+1)^{th}$ navigation star is $(m_{k+1} - m_k)t_{ri}$, and a following formula is obtained:

$$\Phi_{k+1/k} = \exp\left(\frac{1}{2} \Omega_k (m_{k+1} - m_k) t_{ri}\right). \qquad (23)$$

In one embodiment, in step (36):
the optimal attitude quaternion $q^*_{k+1/k+1}$ is obtained according to an eigenvalue and an eigenvector of the character matrix $K_{k+1/k+1}$, and satisfies:

$$K_{k+1/k+1} q^*_{k+1/k+1} = \lambda_{k+1/k+1} q^*_{k+1/k+1} \qquad (24)$$

where the $(k+1)^{th}$ navigation star participates in the attitude matrix estimation to obtain the angular velocity:

$$\begin{bmatrix} \tilde{\omega}_{k+1} \\ 0 \end{bmatrix} = \frac{2}{(m_{k+1} - m_k) t_{ri}} \begin{bmatrix} -e_{k+1} \\ q_{4,k+1} \end{bmatrix} \otimes \begin{bmatrix} e_{k+1} \\ q_{4,k+1} \end{bmatrix} - \frac{2}{(m_{k+1} - m_k) t_{ri}} \begin{bmatrix} -e_{k+1} \\ q_{4,k+1} \end{bmatrix} \otimes \begin{bmatrix} e_k \\ q_{4,k} \end{bmatrix} \qquad (25)$$

where $e_k$ represents a vector portion of the quaternion q, and $q_{4,k}$ represents a scalar portion of the quaternion q.

With the imaging parameter optimization method of the star sensor based on the rolling shutter according to an embodiment of the present disclosure, it is capable to achieve accurate separation of the exposure moments of different navigation stars by precisely controlling the imaging moments of different lines in the star map, which makes up for the lack of dynamic information because the exposure moments of all navigation stars in a single frame of star map are identical; and the adoption of readout and exposure pipelining work mode saves the readout time of the conventional star sensor. Therefore, a continuous navigation star prediction and extracting algorithm with high dynamic property s proposed, and a single star recursion attitude estimation method in the rolling shutter mode is also proposed, thus completing an attitude at a current moment whenever one star is extracted and breaking the algorithm constraints of the star sensor attitude determination based on the multi-vector of the frame image. Moreover, the update rate is increased by one order of magnitude compared with the conventional algorithm, and it is capable to achieve the attitude estimation while there is only one or no star in the field of view for a short time.

The present disclosure breaks through the shortcomings such as long exposure time and long read time, poor dynamic property, deficient instantaneous view field precision and low system update rate of the conventional star sensor in the working process, thus improving the performance of the star sensor significantly.

Reference throughout this specification to "an embodiment," "some embodiments," "one embodiment", "an example," "a specific example," or "some examples," represents that a particular feature, structure, material, or characteristic described in connection with the embodiment or example is comprised in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:
1. A method for determining an attitude of a star sensor based on a rolling shutter imaging, comprising steps of:
providing a star sensor on a spacecraft, the star sensor including an image sensor, a processor, and memory;
obtaining an image with the image sensor, the image having an exposure time $t_{Int}$, a line readout time $t_{rd}$, an interline integral interval time $t_{ri}$ and a frame processing time $t_{Fp}$;
storing the image in the memory;

S1: creating, with the processor, a line based rolling shutter model from the image, the line based rolling shutter model being an optimized relation among the exposure time $t_{Int}$, the line readout time $t_{rd}$, the interline integral interval time $t_{ri}$ and the frame processing time $t_{Fp}$ of the image;

S2: predicting and extracting, with the processor, locations of M navigation stars comprised in a star map stored in the memory of the star sensor according to the optimized relation among the exposure time $t_{Int}$, the line readout time $t_{rd}$, the interline integral interval time $t_{ri}$ and the frame processing time $t_{Fp}$, in which the location of each navigation star of the M navigation stars is used to determine a line number of the each navigation star in the star sensor; and S3:
updating, with the processor, an attitude matrix and an angular velocity of the star sensor according to the locations of the navigation stars and based on a single star recursion attitude estimation of the rolling shutter imaging whenever a position of one navigation star of the M navigation stars is extracted;

applying, with the processor, the attitude matrix of the star sensor to a calculation of the attitude matrix of a next navigation star of the M navigation stars by recursion to obtain a recurring attitude matrix of the star sensor;

fusing, with the processor, the location of the next navigation star and the recurring attitude matrix of the star sensor to form an updated attitude matrix and an updated angular velocity of the star sensor; and determining, with the processor, a final attitude matrix and a final angular velocity of the spacecraft by transferring the updated the attitude matrix and the updated angular velocity of the star sensor sequentially.

2. The method according to claim 1, wherein the image sensor is an APS image sensor having the rolling shutter mode disposed in the star sensor.

3. The method according to claim 2, wherein a sensor line number of the image sensor is "n", and the line readout time $t_{rd}$ of each line of the image is identical to the interline integral interval time $t_{ri}$, and the exposure time $t_{Int}$ of the image satisfies a following formula:

$t_{Int} \leq (n-1)t_{rd}$.

4. The method according to claim 3, wherein in step S1, the image sensor is configured to perform a circular exposure based on the line sequentially, to circularly read the image obtained by the circular exposure with the line readout time $t_{rd}$ sequentially, and to synchronize the reading of the image and the exposure of the image, in which a first read moment of the image obtained by the exposure is identical to an exposure moment of an $n^{th}$ line of the image.

5. The method according to claim 4, wherein step S2 comprises:

S21: combining the attitude matrix of the star sensor with a time $t_k$ of extracting a $k^{th}$ navigation star to form a combined variable AR:

$AR_k \equiv [A_k\ t_k] = [A_k\ m_k t_{ri}]$ where $A_k$ represents the attitude matrix of the star sensor obtained by calculation after the location of the $k^{th}$ navigation star is extracted, $t_k$ represents an exposure moment corresponding to the $k^{th}$ navigation star, and $m_k$ represents a line number of the $k_{th}$ navigation star in the image sensor;

S22: predicting the locations of the M navigation stars in a field of view of the star sensor; and S23: setting a ROI window based on the predicted locations of the M navigation stars to extract the locations of the M navigation stars.

6. The method according to claim 5, wherein step S22 comprises:

S221: assuming that an $M^{th}$ navigation star in a previous frame of the image is located in an $m_0$ line and the attitude matrix of the star sensor obtained after the location of the $M^{th}$ navigation star is extracted is $A_0$, obtaining the angular velocity $\tilde{\omega}_0$ of the star sensor by estimating;

S222: assuming that a first navigation star in a current frame of the image is located in an $m_1$ line and the attitude matrix of the star sensor obtained after the location of the first navigation star is extracted is $A_1$, obtaining the angular velocity $\tilde{\omega}_1$ of the star sensor by estimating:

$\tilde{\omega}_1 = [I - A_1 A_0^T]/[(n - m_0 + m_1)t_{ri}]$, obtaining a predicted location $(\hat{X}_{m1-M}, \hat{Y}_{m1-M})$ of the first navigation star relative to the $M^{th}$ navigation star by estimating a location of the $M^{th}$ navigation star in the image sensor in the current frame;

S223: obtaining the predicted locations $(\hat{x}_{m2-M}, \hat{y}_{m2-M})$-$(\hat{x}_{(M-1)-M}, \hat{y}_{(M-1)-M})$ of the $M^{th}$ navigation star relative to the $2^{nd}$-$(M-1)_{th}$ navigation stars sequentially;

S224: estimating the location of the $M^{th}$ navigation star in the current frame based on the $\tilde{\omega}_0$ and the predicted locations of the $M^{th}$ navigation star; and S225: repeating steps S221-S224 to obtain the predicted locations of other navigation stars sequentially.

7. The method according to claim 1, wherein step S3 comprises:

S31: obtaining an attitude matrix $q_k$, a character matrix $K_k$ and an angular velocity $\tilde{\omega}_k$ of an initial frame of the image according to an initial capturing algorithm, and recording a line number $m_k$ of a $k^{th}$ navigation star;

S32: extracting a location of a $(k+1)^{th}$ navigation star with a line number of $m_{k+1}$, estimating a difference of exposure times of the $k^{th}$ navigation star and the $(k+1)^{th}$ navigation star according to the angular velocity $\tilde{\omega}_k$, the line number $m_k$ of the $k^{th}$ navigation star, the $k^{th}$ navigation star and a previous attitude matrix, and calculating a transition matrix $\Phi_{k+1/k}$;

S33: estimating a character matrix $K_{k+1/k}$ corresponding to an attitude quaternion of a moment corresponding to the $k^{th}$ navigation star:

$K_{k+1/k} = \Phi_{k+1/k} k_{k/k} \Phi_{k+1/k}^T$;

S34: adding a measure vector and a reference vector of the $(k+1)^{th}$ navigation star to the estimation of the attitude matrix of the star sensor according to a vector observation value and a vector reference value of the $(k+1)^{th}$ navigation star, and calculating $\delta K_{k+1}$ of the $(k+1)_{th}$ navigation star;

S35: fusing data of steps S33 and S34 to calculate a character matrix $K_{k+1/k+1}$ corresponding to a quaternion including the $k^{th}$ navigation star:

$K_{k+1/k+1} = (1-\rho)K_{k+1/k} + \rho \delta K_{k+1}$ where $0 < \rho < 1$, and $\rho$ represents a weighing coefficient of the $k^{th}$ navigation star vector; and S36: calculating an optimal attitude quaternion $q^*_{k+1/k+1}$ and an angular velocity $\tilde{\omega}_{k+1}$ according to the character matrix $K_{k+1/k+1}$, and returning back to step S32 to perform a next recursion and a next attitude matrix estimation of the star sensor.

8. The method according to claim 7, wherein in step S32, a following formula is obtained according to a relation between a quaternion difference equation and the angular velocity:

$$\dot{q} = \frac{1}{2}\Omega q,$$

$$\Omega = \begin{bmatrix} -[\omega \times] & \omega \\ -\omega^T & 0 \end{bmatrix}$$

where $[\omega \times]$ is:

$$[\omega \times] = \begin{bmatrix} 0 & -\omega_3 & \omega_2 \\ \omega_3 & 0 & -\omega_1 \\ -\omega_2 & \omega_1 & 0 \end{bmatrix}$$

and $\omega=[\omega_1,\omega_2,\omega_3]$ is a triaxial angular velocity of the star sensor.

9. The method according to claim 8, wherein if the attitude quaternion estimated when a location of the $k^{th}$ navigation star is extracted is $q_k$, an angular velocity estimated when the location of the $k^{th}$ navigation star is extracted is $\tilde{\omega}_k=[\omega_1, \omega_2, \omega_3]^T$, the $k^{th}$ navigation star is located in a line $m_k$ in the image, and a location of the $(k+1)^{th}$ navigation star located in a line $m_{k+1}$ in the image is extracted, then an interval time from the $k^{th}$ navigation star to the $(k+1)^{th}$ navigation star is $(m_{k+1}-m_k)t_{ri}$ and a following fomula is obtained:

$$\Phi_{k+1/k} = \exp\left(\frac{1}{2}\Omega_k(m_{k+1} - m_k)t_{ri}\right).$$

10. The method according to claim 8, wherein in step S36: the optimal attitude quaternion $q^*_{k+1/k+1}$ is obtained according to an eigenvalue and an eigenvector of the character matrix $K_{k+1/k+1}$, and satisfies:

$$K_{k+1/k+1}q^*_{k-1/k+1}=\lambda_{k+1/k+1}q^*_{k-1/k+1}$$

where the $(k+1)^{th}$ navigation star participates in the attitude matrix estimation to obtain the angular velocity:

$$\begin{bmatrix} \tilde{\omega}_{k+1} \\ 0 \end{bmatrix} = \frac{2}{(m_{k+1} - m_k)t_{ri}}\begin{bmatrix} -e_{k+1} \\ q_{4,k+1} \end{bmatrix} \otimes \begin{bmatrix} e_{k+1} \\ q_{4,k+1} \end{bmatrix} - \frac{2}{(m_{k+1} - m_k)t_{ri}}\begin{bmatrix} -e_{k+1} \\ q_{4,k+1} \end{bmatrix} \otimes \begin{bmatrix} e_k \\ q_{4,k} \end{bmatrix},$$

where $e_k$ represents a vector portion of the quaternion q, and $q_{4,k}$ represents a scalar portion of the quaternion q.

* * * * *